Figure 1:
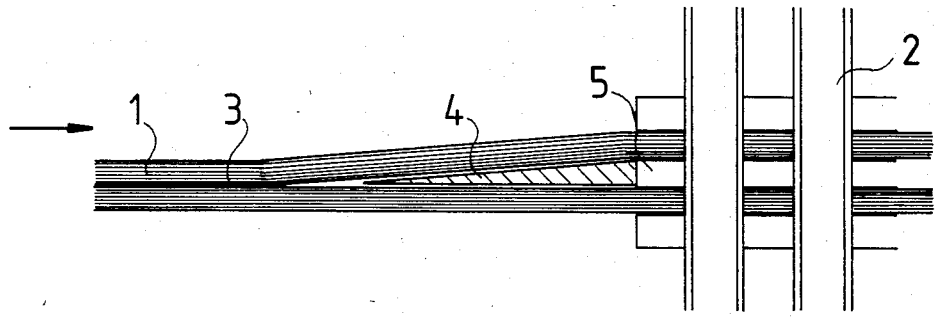

United States Patent [19]

Sinko

[11] Patent Number: 4,638,843
[45] Date of Patent: Jan. 27, 1987

[54] METHOD FOR THE MANUFACTURE OF A VENEER BEAM

[75] Inventor: Hannu Sinko, Lahti, Finland
[73] Assignee: Raute Oy, Lahti, Finland
[21] Appl. No.: 794,386
[22] Filed: Nov. 4, 1985
[30] Foreign Application Priority Data Dec. 5, 1984 [FI] Finland .................................. 844824

[51] Int. Cl.⁴ .............................................. B27D 1/00
[52] U.S. Cl. ................................... 144/350; 144/348; 156/288; 156/311; 156/324
[58] Field of Search ...................... 156/288, 324, 311; 144/345, 348, 350

[56] References Cited

U.S. PATENT DOCUMENTS 3,242,025  3/1966  Copp .................................... 144/348
3,377,223  4/1968  Clausen et al. ..................... 144/348
4,543,147  9/1985  Noto et al. .......................... 156/288

*Primary Examiner*—W. D. Bray
*Attorney, Agent, or Firm*—Wolf, Greenfield & Sacks

[57] ABSTRACT

The invention is concerned with a method for the manufacture of a laminated beam out of sheets of veneer as a continous process. According to the method, the sheets of veneer are stacked, in consideration of the sequence of stacking, as glued or non-glued as a continuous setting consisting of a number of layers corresponding to the desired thickness of the beam on a suitable transfer base. This setting is passed on the base into a preliminary press, pressed in the preliminary press, as well as passed into a hot press (2) for the purpose of hardening the glue. In order to permit a more efficient operation of the hot press, in the method a continuous gap (3) free of adhesive and having a width equal to the width of the whole setting is produced in the setting between at least two desired layers of veneer, along which said gap the beam blank is divided (4), after the stage of preliminary pressing, into separate blank lines. The blank lines are then passed into hot-press gaps of their own.

7 Claims, 2 Drawing Figures

METHOD FOR THE MANUFACTURE OF A VENEER BEAM

The present invention is concerned with a method for the manufacture of a veneer beam.

In prior art, it is known to manufacture a veneer beam as a continuous beam by, in accordance with a predetermined program, forming a continuous setting of glued or unglued veneer sheets. The glueing or non-glueing of a sheet is determined by the position of the sheet in the setting. The setting is then pressed in a hot press to make a ready beam blank. The hot press is preferably preceded by a cold press stage in order to reduce the pressing time required by the hot press stage. After the hot press, the beam blank is sawn in the longitudinal direction into beams of desired width as well as cut off in the transverse direction in accordance with the desired beam length. In spite of the integration of a cold press stage in the process, the hot press determines the capacity of the production line, for the heating of all the parts of the beam to the temperature required by the hardening of the glue is a process essentially slower than what is required by the forming of the beam blank. The restricting effect of the hot press is increased intensively as the thickness of the beam to be manufactured, i.e. the number of veneer layers to be joined together by glueing, is increased.

The problem might, of course, be reduced by using a substantially longer hot press, whereby a longer section of beam blank could be compressed therein at a time. This alternative is, however, not rational and, with the present-day press technique, not even controllable, for with this line of thinking the hot press would become an unduly dominating part, as regards its cost and its construction, as compared with the other equipment in the production line.

Thus, the foundation of the invention subject of the present application is a pattern of thinking of a different direction, i.e. the beam blank is divided into several parts in the direction of thickness, each of the said parts being passed into a hot press gap of its own. In such a case, it is possible to use the hot presses in existing lines, in which said presses it is, as a rule, possible to provide two press gaps placed one above the other by placing a heatable intermediate plate in the press gap. In new installations, in the dimensioning of the opening of the hot press, it is also possible to take into account the possibility that even more heating plates are placed in the press gap, e.g. two or three plates, depending on the thickness of the beam (beams) to be produced as well as on the relative dimensional proportion between the setting devices and the hot press.

Figure 2:
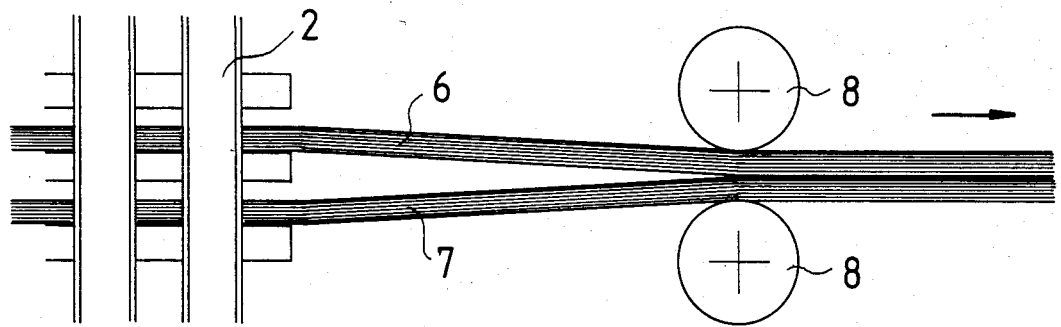

The invention will be described in more detail with the aid of the accompanying exemplifying drawing, wherein FIG. 1 is a schematical view of the line of production immediately before the hot press at the stage of division of the blank layers, and FIG. 2 shows an embodiment of the invention immediately after the hot press.

In FIG. 1, the reference numeral 1 denotes the setting which comes from the cold press, which said cold press performs the preliminary pressing and by means of which said cold press the setting is preferably fed forwards into the hot press 2. In accordance with the method of the invention, in the setting a gap 3 free of adhesive is provided, so that the top faces of the veneers placed below this gap have been allowed to remain free of adhesive, in a corresponding way as the top faces of the veneers in the topmost layer of the whole setting are allowed to remain free of adhesive. The top faces of all the other veneers passed into the setting are provided with adhesive.

In view of carrying out the method in accordance with the invention, ahead of the hot press 2, a wedge-shaped divider 4 is placed, which extends across the whole setting and whose function is to divide the setting into two parts along the gap 3 free of adhesive. Moreover, the hot press 2 used in the method has been modified so that a heatable intermediate plate 5 has been placed in its press gap, the plane dimensions of the said plate 5 equalling the press plates of the heat press. The thickness of the intermediate plate is determined by the heating devices placed in the plate, such as electric resistors or steam ducts.

By means of the method of the present invention, it has been possible to increase the capacity of the beam production line essentially, in particular in the case of relatively thin beams, because the heating energy transferred by the intermediate plate 5 permits the pressing of a double beam thickness during a cycle of operation of the hot press, during which said time, in the prior-art method, substantially a single thickness only can be pressed. According to the experience obtained, this circumstance has permitted uninterrupted operation of the line, and the setting devices need no longer keep waiting for the working of the hot press stage.

A limitation on the use of the method in existing equipment is, of course, imposed by the size of the press gap of the hot press and by the thickness dimension of the intermediate plate. Thus, beams whose double thickness together with the intermediate plate 5 exceeds the gap dimension of the hot press 2 must be manufactured by the conventional, very slow technique. Products of the said sort are, however, rarely concerned in practice.

The power of the intermediate heating plate 5 is preferably such that the plate produces the same heating effect in the beam blank as the heating plates proper of the press do, whereby, in theory, and very extensively also in practice, the capacity of the line can be made double as compared with the prior-art operation. On the other hand, even an intermediate heating plate of lower power contributes significantly to the acceleration of the operation of the line. It is possible to use an intermediate heating plate of lower heating capacity if this lower capacity results in a reduced thickness dimension of the plate, whereby, by the method, correspondingly thicker beams can be manufactured. Of course, it is an ideal situation that the hot press can be dimensioned so that it swallows all the beam blank continuously produced by the setting devices without stages of waiting in the operation of the setting devices.

From the point of view of the operation of the line, it is preferable that the adhesive-free gap 3 is placed substantially halfway in the thickness of the setting, whereby the component beam blanks separated from each other are heated in the hot press throughout to the desired temperature at the same time. By means of the method of the invention, it is, however, also possible to produce two veneer beams of different thicknesses at the same time, in which case the thicker beam component, of course, determines the duration of the cycles of operation of the hot press stage.

FIG. 2 shows a modification of the invention in respect of the after-treatment of the beam blanks. The beam blanks coming from the hot press 2 may be combined at some distance from the hot press, e.g., by means of press rolls 8, whereby the longitudinal sawing and the transverse cut-off sawing of the beams must be performed at the same time in respect of both of the beam blanks.

As an alternative embodiment, it is, however, possible to use a procedure in which both of the beam blanks are passed from the hot press to the sawing as separate, whereby the cut-off sawing steps may be placed at different positions. Depending on the sawing device, it is also possible to place the longitudinal sawing at different positions of the widths of the beam blank lines, in which case it is possible to produce beam products of even highly different sizes on the line at the same time, in particular if even the settings of the blanks are of different thicknesses.

What is claimed is:

1. A method for simultaneously producing a plurality of laminated veneer beam blanks comprising:
   providing a continuous setting comprising layered sheets of veneer with adhesive between the sheets but having at least one adhesive-free gap extending the width of the setting between the sheets;
   dividing the setting along the gap into separate beam blanks; and
   passing each of the beam blanks into separate hot-press gaps to form a plurality of laminated veneer beam blanks.

2. The method of claim 1, wherein each of the hot-press gaps produces substantially the same heating effect in the beam blank.

3. The method of claim 1, wherein the adhesive-free gap is substantially half-way in the thickness of the setting.

4. A method for simultaneously producing a plurality of laminated veneer beam blanks comprising:
   providing a continuous setting comprising layered sheets of veneer with adhesive between the sheets but having at least one adhesive-free gap extending the width of the setting between the sheets;
   passing the setting through a cold press;
   dividing the setting along the gap into separate beam blanks; and
   passing each of the beam blanks into separate hot-press gaps to form a plurality of laminated veneer beam blanks.

5. A method for producing a composite beam blank from a plurality of laminated veneer beam blanks comprising:
   providing a continuous setting comprising layered sheets of veneer with adhesive between the sheets but having at least one adhesive-free gap extending the width of the setting between the sheets;
   dividing the setting along the gap into separate beam blanks;
   passing each of the beam blanks into separate hot-press gaps to form a plurality of laminated veneer beam blanks; and
   combining the plurality of beam blanks to form a composite beam blank.

6. The method of claim 5, wherein the plurality of beam blanks are combined by press rolls.

7. A method for producing beams from a plurality of laminated veneer beam blanks comprising:
   providing a continuous setting comprising layered sheets of veneer with adhesive between the sheets but having at least one adhesive-free gap extending the width of the setting between the sheets;
   dividing the setting along the gap into separate beam blanks;
   passing each of the beam blanks into separate hot-press gaps to form a plurality of laminated veneer beam blanks; and
   passing each of the laminated veneer beam blanks to separate means for sawing the blanks into beams.

* * * * *